No. 651,807. Patented June 12, 1900.
A. W. MACONOCHIE.
TIN FOR INCLOSING PRESERVED PROVISIONS OR FOODS OR THE LIKE.
(Application filed Sept. 15, 1899.)
(No Model.) 2 Sheets—Sheet 1.
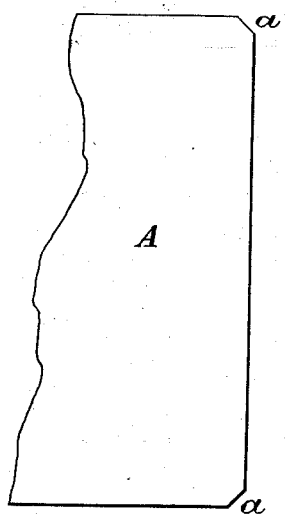
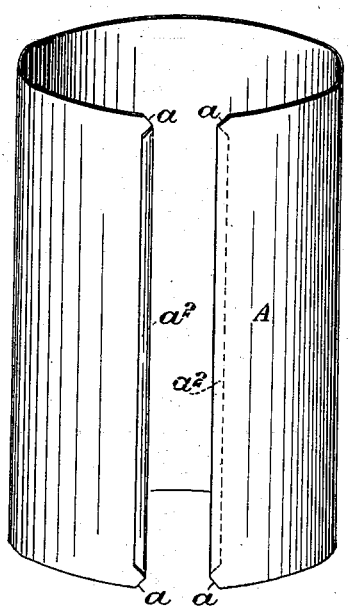
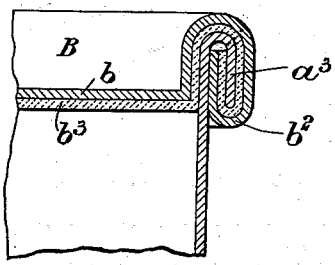

No. 651,807. Patented June 12, 1900.
A. W. MACONOCHIE.
TIN FOR INCLOSING PRESERVED PROVISIONS OR FOODS OR THE LIKE.
(Application filed Sept. 15, 1899.)
(No Model.) 2 Sheets—Sheet 2.
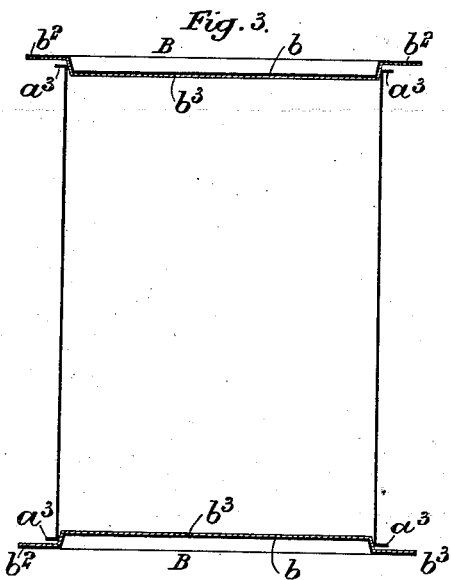
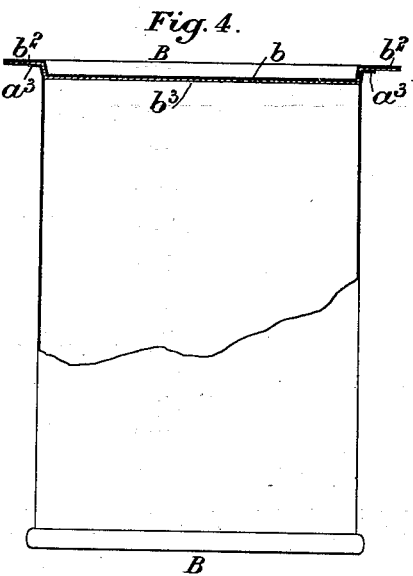
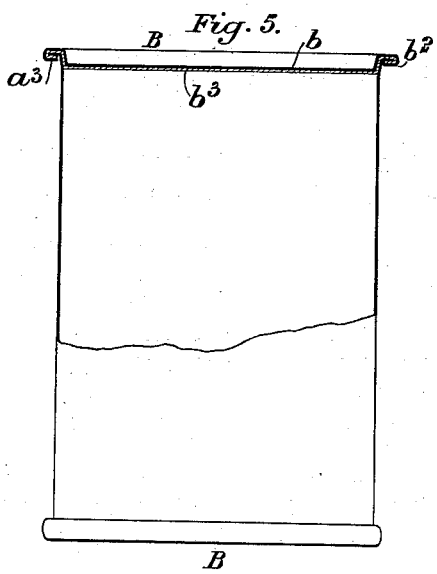
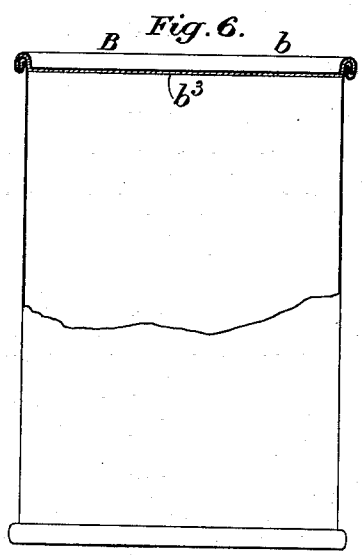

UNITED STATES PATENT OFFICE.

ARCHIBALD W. MACONOCHIE, OF LONDON, ENGLAND.

TIN FOR INCLOSING PRESERVED PROVISIONS OR FOODS OR THE LIKE.

SPECIFICATION forming part of Letters Patent No. 651,807, dated June 12, 1900.

Application filed September 15, 1899. Serial No. 730,535. (No model.)

*To all whom it may concern:*

Be it known that I, ARCHIBALD WHITE MACONOCHIE, a subject of the Queen of Great Britain and Ireland, and a resident of 131 Leadenhall street, in the city of London, England, have invented certain new and useful Improvements in or Connected with Tins for Inclosing Preserved Provisions or Foods or the Like, (for which I have applied for a patent in Great Britain, No. 15,149, July 22, 1899,) of which the following is a specification.

My invention has for its object to provide tins for containing preserved provisions or foods and the like, which tins are expeditiously and economically made without the use of solder or with the use of but a minimum amount of solder and which are absolutely tightly closed.

I will describe my invention with reference to the accompanying drawings.

Figure 1 shows a part of a plate for the body of the tin. Fig. 2 shows the complete tin bent into shape. Figs. 3 to 6 are sections of tins in various stages of securing the top, (the bottom being secured in like manner.) Fig. 7 is an enlarged section of part of a tin to show more clearly the way in which the joint is formed.

According to my invention the body part of the tin is made from a sheet A of tin-plate of a size in accordance with the tin to be produced. The four corners are removed, as shown at $a$, and the meeting edges are turned over in reverse directions, as shown at $a^2$, so that they can be engaged together by folding over each other or after the manner of hooks. Pressure is then applied to the edges thus engaged together, so as to make a tight joint, which can, if desired, be further secured by applying solder along the joint. The upper and lower ends are then turned out, so as to form flanges $a^3$ at top and bottom, the removal of the corners, as aforesaid and as shown at $a$, having prevented the formation of the several thicknesses of metal at the parts to be flanged, which would occur if the corners were not removed. To make the two ends, I take tin-plate and apply to it by means of gelatin or other suitable cementing material a sheet or sheets of paper, linen, or the like. I then subject the combined plate of tin and paper, linen, or the like to the action of dies, so as to stamp therefrom the two ends B, each of which has a depressed mid-portion $b$, the periphery of which is preferably somewhat inclined, so that its lower part will enter the opening at the end of the body part of the tin, its upper part being slightly larger in diameter than the said opening. Projecting around from the upper part of the said periphery is a flange $b^2$ of a diameter exceeding that of the flanges $a^3$ on the body part. The paper, linen, or the like is situated at and covers the under side of the end, as shown at $b^3$. This protects the contents from the tin at both ends. One of the ends is put in place at one end of the body part, as shown in Fig. 3, and is forced downward, so that the periphery is forced into the mouth of the tin, as shown in Fig. 4, and if it be inclined, owing to its inclination and its slightly-larger diameter at its upper part, it forms a very tight closure. The flange on the said end is then "spun" or turned under the flange of the body part, as shown at Fig. 5, or the flanges are rolled together, as shown in Figs. 6 and 7, the paper, linen, or the like being confined thereby between the parts and making a perfect joint between the body part and the said end. After the food or other material has been put in the tin the other end is similarly applied and secured, and the tin as a whole is perfectly closed.

If desired, solder may be applied at the parts where the joint of the body part meets the joints at top and bottom.

The body part will usually be made circular and the top and bottom in the form of disks; but I do not limit myself to this particular shape.

Having now particularly described and ascertained the nature of the said invention and in what manner the same is to be performed, I declare that what I claim is—

A tin for inclosing preserved provisions or foods or the like consisting of a body part formed of a rectangular plate having its corners removed, its vertical meeting edges hooked and pressed together, and its upper and lower edges bent outwardly to form flanges, and a top and a bottom each made of a sheet of metal having a covering of paper cemented over its inner face and bent to form a projecting central part which is adapted to fit closely within the open end of the body part and an outer flange adapted to be turned under the flange on the body part.

In testimony whereof I have signed this specification in the presence of two subscribing witnesses.

A. W. MACONOCHIE.

Witnesses:
WILLIAM FREDERICK UPTON,
PERCY READ JORDRINE.